Aug. 6, 1968  J. E. MORGAN  3,395,930
TILTABLE STEERING WHEEL
Filed March 7, 1966  5 Sheets-Sheet 1
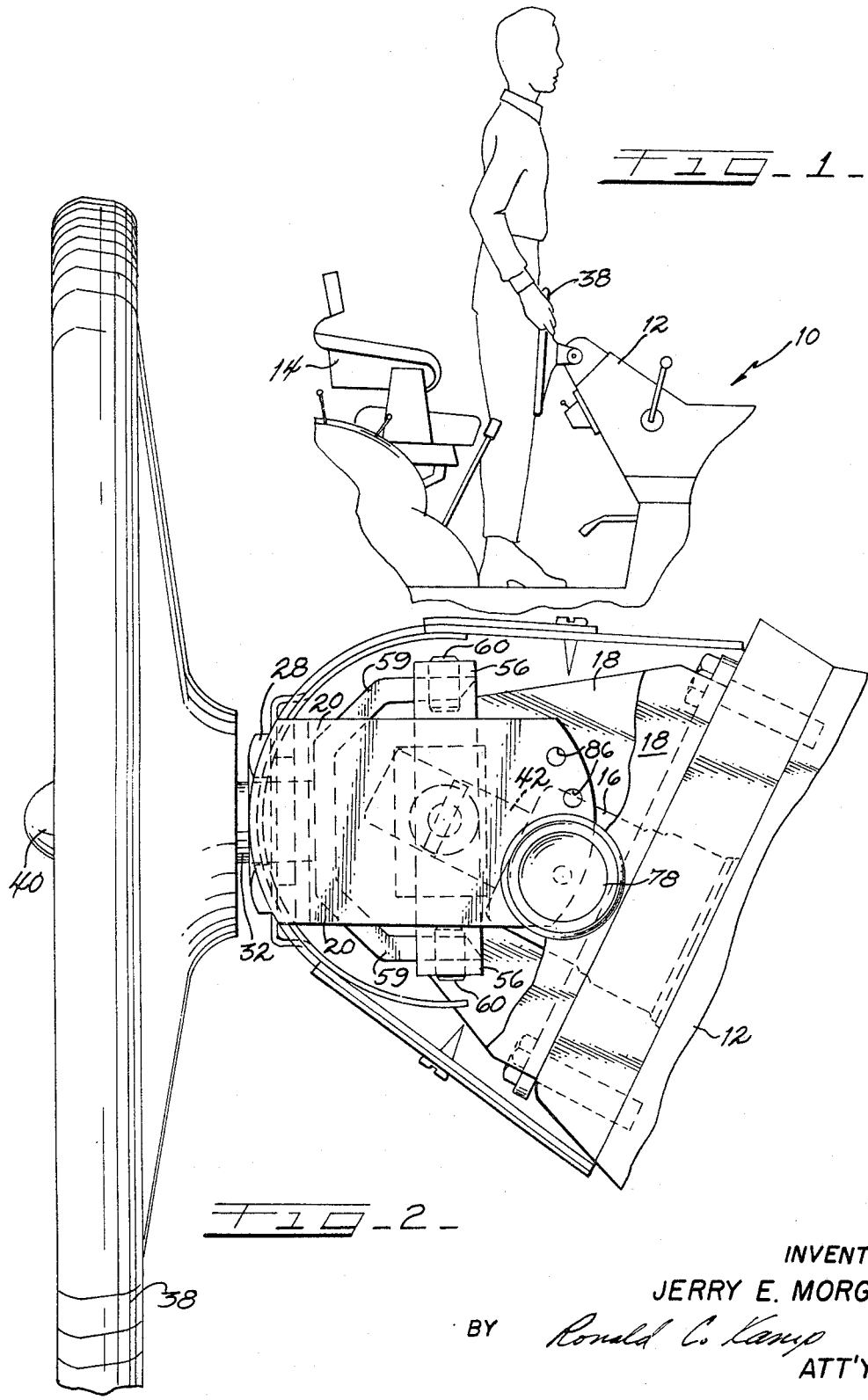
INVENTOR
JERRY E. MORGAN
BY Ronald C. Kamp
ATT'Y.

Aug. 6, 1968  J. E. MORGAN  3,395,930
TILTABLE STEERING WHEEL
Filed March 7, 1966  5 Sheets-Sheet 2
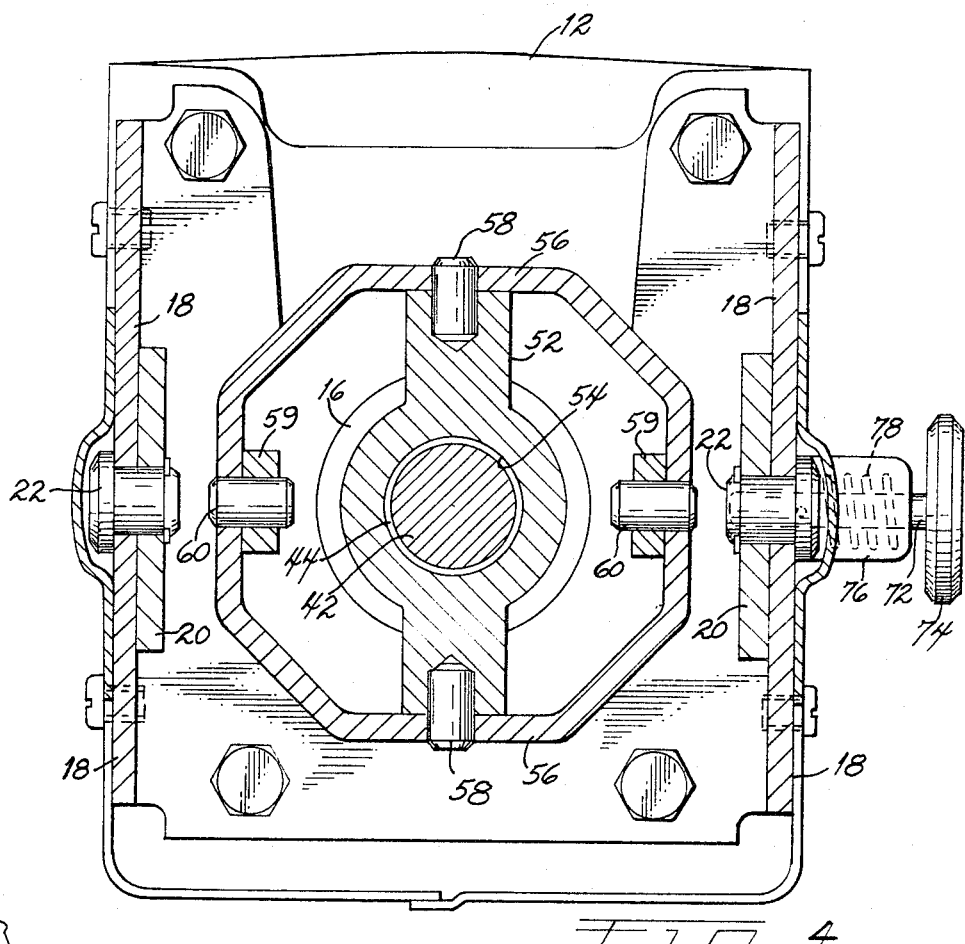
FIG_4_
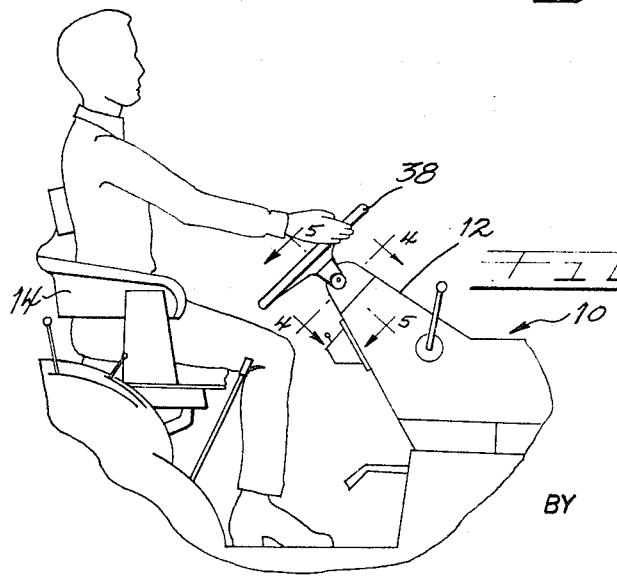
FIG_3_
INVENTOR
JERRY E. MORGAN
BY Ronald C. Kamp
ATT'Y.

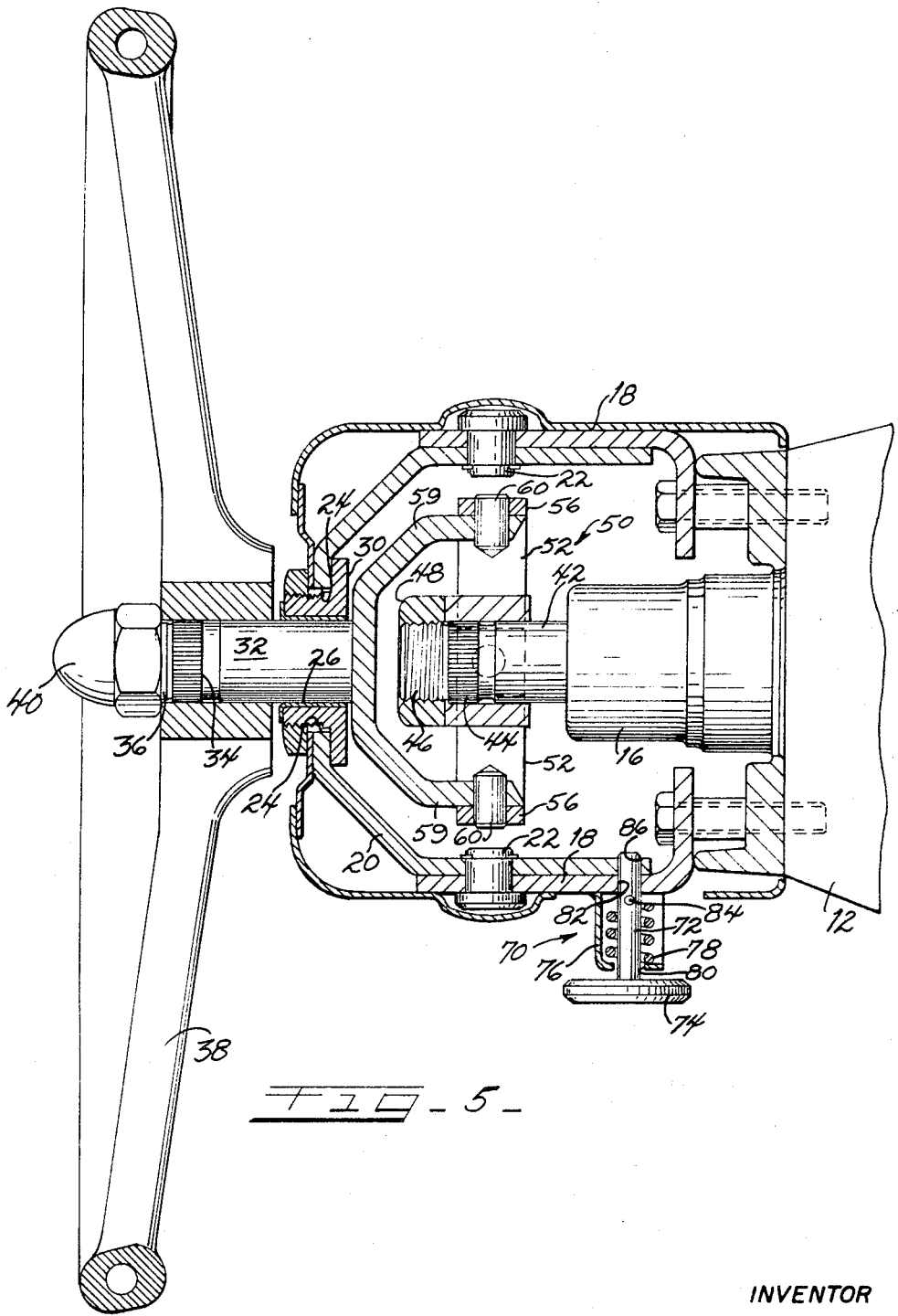

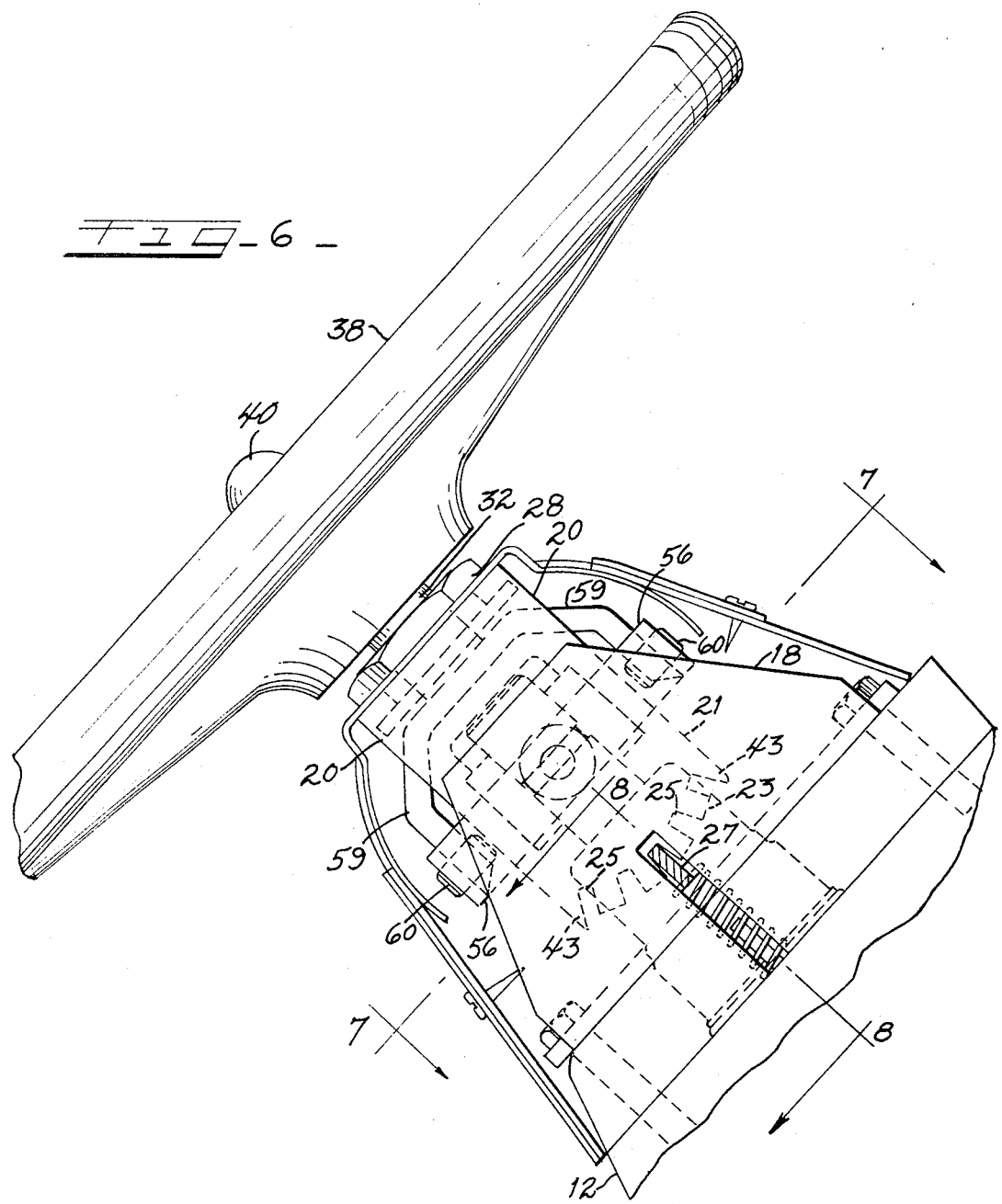

Aug. 6, 1968   J. E. MORGAN   3,395,930
TILTABLE STEERING WHEEL
Filed March 7, 1966   5 Sheets-Sheet 5

INVENTOR
JERRY E. MORGAN
BY Ronald C. Kamp
ATT'Y.

United States Patent Office 3,395,930
Patented Aug. 6, 1968

3,395,930
TILTABLE STEERING WHEEL
Jerry E. Morgan, Clarendon Hills, Ill., assignor to International Harvester Company, a corporation of Delaware
Filed Mar. 7, 1966, Ser. No. 532,443
7 Claims. (Cl. 280—87)

ABSTRACT OF THE DISCLOSURE

A hydrostatic steering system having a tiltable steering wheel operatively affixed through a flexible connection to a rigidly mounted control pump forming a portion of a conventional hydrostatic steering circuit so that the hydraulic components of the circuit are isolated from and unaffected by tilting of the wheel.

---

The present invention relates generally to tiltable steering wheels, and more particularly, to tiltable steering wheels for use with hydrostatic steering systems.

In a conventional hydrostatic steering system, there is no mechanical connection between the steering wheel which is manipulated by the operator and those ground-engaging wheels utilized for determining the vehicle's direction of travel. Instead, a control pump is connected to the steering wheel in a manner such that rotation of this wheel will produce a flow of hydraulic fluid from the control pump. This flow is then utilized to determine the direction and quantity of hydraulic fluid under pressure delivered to the hydraulic ram or rams incorporated into the steering linkage from the power pump driven by the vehicle's engine. It is apparent that continuous fluid communication between the hand control pump and the remainder of the hydraulic steering circuit is necessary in order that the operator will have complete control of the vehicle and its direction of travel.

It is, therefore, an object of the present invention to provide a tiltable steering wheel for a vehicle having a hydrostatic steering system wherein tilting of the steering wheel will not subject any of the hydraulic components of the hydrostatic steering system to any stresses or strains.

It is also an object of the present invention to provide a tiltable steering wheel arrangement for a hydrostatic power steering system which is relatively maintenance free and which is inherently safe in operation.

These and other objects of the present invention will become more readily apparent upon a consideration of the following description taken in conjunction with the accompanying drawings, wherein:

FIGURE 1 is a side elevational view of a portion of a tractor including the improved steering arrangement of the invention illustrating the position of the steering wheel when the operator is standing erect;

FIGURE 2 is a detailed view of the tiltable steering wheel shown in FIGURE 1 with portions broken away for clarity;

FIGURE 3 is a view similar to FIGURE 1 but showing the steering wheel tilted to a position to permit operation while seated;

FIGURE 4 is a section taken on line 4—4 of FIGURE 3;

FIGURE 5 is a section taken on line 5—5 of FIGURE 3;

FIGURE 6 is a side elevational view of a tiltable steering wheel according to the present invention showing a modified form of latch means;

Figure 7:
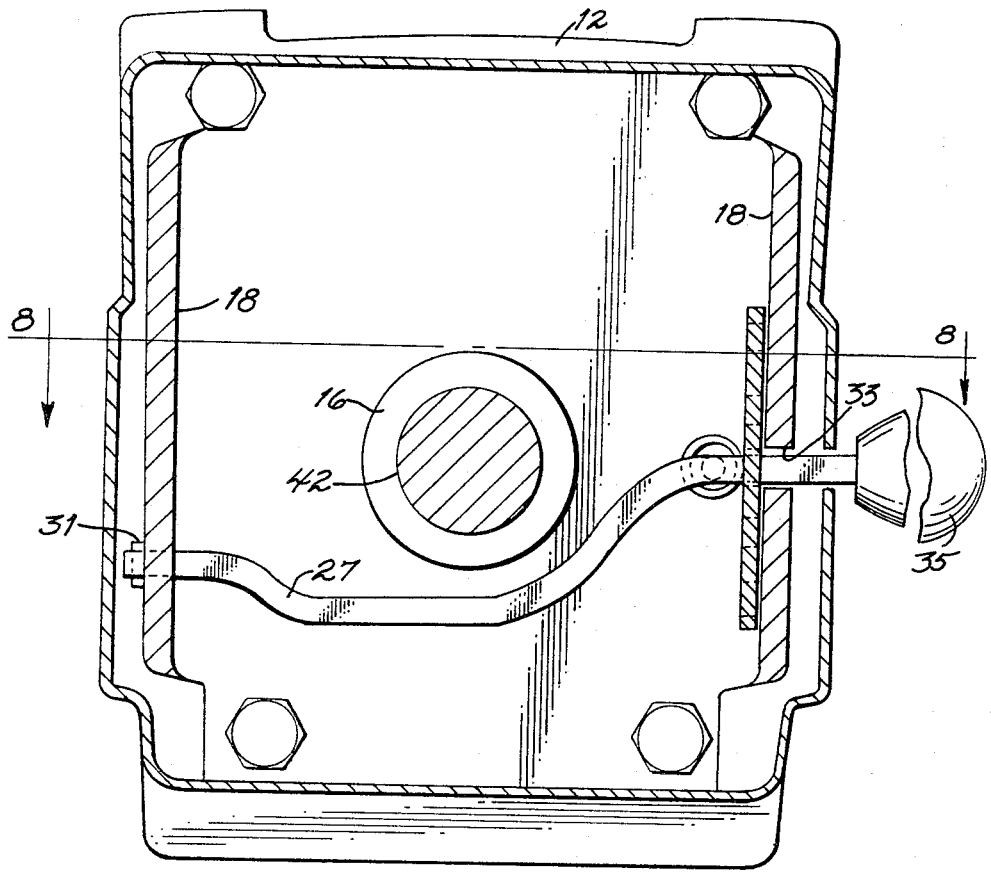
FIGURE 7 is a section taken on line 7—7 of FIGURE 6.

Referring now to the details of FIGURES 1 and 3, there is shown a portion of a tractor, indicated generally at 10, having a control console 12 which is rigidly secured to the frame of the tractor and an operator's seat 14 mounted thereon. As best seen in FIGURES 2 and 5 a control pump 16 is rigidly secured to the control console 12 and is in hydraulic communication through hoses or conduits, not shown, with a conventional hydrostatic steering system. A pair of upstanding transversely spaced brackets 18 are secured to the console 12 and pivotally support a generally U-shaped support member 20 by means of pivot pins 22. The support member 20 is provided with a central opening 24 and a bushing 26 is secured to the member 20 within the opening 24 by threadingly engageable fastening means 28 and 30. A steering post 32 is rotatively received by the bushing 26 and is splined at 34 and threaded at 36 to receive a steering wheel 38 having a central opening with complementary internal splines engageable with the splines 34. A crown nut 40 engages the threads 36 and is utilized to retain the steering wheel 38 on the steering post 32. The control pump 16 as an impeller shaft 42 rotatably retained therein and extending outwardly toward the steering wheel 38. A flexible drive connector, indicated generally at 50 is provided to secure the steering post 32 to the impeller shaft 42 so that rotation of the steering wheel 38 will result in rotation of the impeller shaft 42. In the embodiment illustrated in FIGURES 2, 4 and 5, the flexible connector 50 consists of a crossbar 52 having a splined opening 54. The crossbar 52 is secured to the impeller shaft 42 by engagement of the splined opening 54 with a complementary splined portion 44 of the shaft 42 and is retained in position by a nut 48 threadingly engaging a threaded portion 46 on the end of impeller shaft 42. The crossbar 52 is pivotally secured to a compensating ring 56 by means of pivot pins 58. A yoke 59 is pivotally attached to the compensating ring 56 by means of pivot pins 60 and is secured to the steering post 32. The pivot pins 58 and 60 are arranged in a plane such that the axis defined by the pivot pins 58 is perpendicular to the axis defined by pivot pin 60. In addition, the axis defined by the pivot pins 22 always lies in the plane of the compensating ring 56, i.e. the plane defined by the pivot axes of pivot pins 58 and 60. It is, therefore, apparent that the steering wheel can be pivoted about the axes of pivot pins 22 resulting in variations in the angularity between the steering post 32 and the impeller shaft 42, and that despite such angular variations, rotation of the steering wheel 38 will result in rotation of the impeller shaft 42 thereby producing a hydraulic fluid flow from the control pump 16.

The latch means indicated generally at 70, is provided to selectively release and secure the support member 20 relative to the brackets 18. In the embodiment shown in FIGURES 2, 4 and 5, the latch means 70 comprises a latch pin 72 having a knob 4 on one end thereof. A spring housing 76 is secured to the exterior of brackets 18 and serves both as a cover and a reaction member for biasing spring 78. The free end of pin 78 extends through an opening 80 in housing 76 and through an opening 82 formed in the bracket 18. The biasing member 78 is a compression spring positioned over the pin 72 between one end of the housing 76 and a transverse pin 84 extending through and beyond the latching pin 72 so as to be engageable by the spring 78. A plurality of holes 86 are formed in the free end of one of the arms of the support member 20 and are arranged in an arc having its center at the pivot axis defined by the pins 22. It will be apparent that the member 20 will be latched, i.e. rendered immobile relative to the bracket 18, whenever the latching pin 72 is inserted into one of the openings 86 formed in the free end of member 20. However, whenever the operator desires to change the position or attitude of the steering wheel 38 he has merely to extract the pin 72 from the hole 86 by pulling outwardly on the knob 74 against the bias of the spring 78. Once the latching pin 72 is removed from the hole 86, the member 20 and the steering wheel 38 carried thereby can be pivoted relative to the supporting brackets 18 about the axis defined by the pins 22 to the desired position and upon release of the knob 74 the spring 78 will urge the latching pin 72 into engagement with one of the openings 86 latching or securing the steering wheel in its new position.

Figure 8:
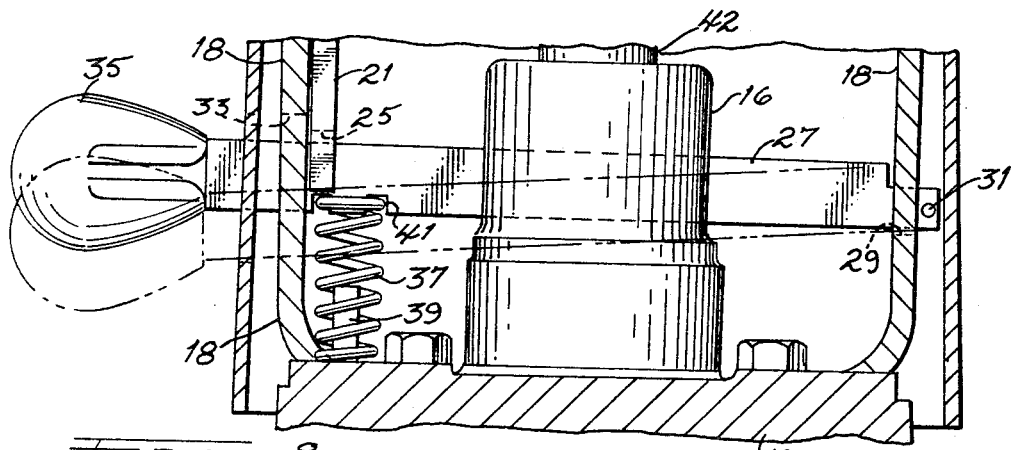
FIGURE 8 is a section taken on line 8—8 of FIGURE 6 but eliminating the upper portion thereof to show the details of the latch mechanism.

Referring now to FIGURES 6, 7 and 8, there is shown a tiltable steering wheel which is basically the same as that shown in FIGS. 1–5, but which illustrates a second preferred embodiment of latching means. As shown in FIGURES 6 and 8, the member 20 is provided with an extended arm 21, i.e. one of the arms of the member 20 is longer than the other and the longer of the two is referred to as extended arm 21. The extreme edge 23 of the extended arm 21 is shaped in the form of an arc having its center on the pivot axis defined by the pivot pin 22. A plurality of notches 25 are formed in the edge 23 and are adapted to receive a latching bar 27. A slot 29 is formed in the bracket 18 opposite the extended arm 21 and the latching bar 27 extends therethrough and is retained by a pin 31. The latching bar 27 is curved, as shown in FIGURE 7, so that it extends from the bracket 18 opposite the extended arm 21 around the pump 16 and through a slot 33 formed in the bracket adjacent to the extended arm 21 at a point which lies in a plane defined by the longitudinal axis of the propeller shaft 42 and the pivot pins 22. A knob 35 is provided on the free end of the latching bar 27 to facilitate grasping and manipulation of the bar 27 by the operator. A compression spring 37 is positioned between the lower side of the latching bar 27 and the control console 12. A pin 39 secured to the console 12 and a seat 41 formed on the underside of the latching bar 27 retain the spring 37 in position for urging the latching bar 27 upward into engagement with one of the notches 25. The slot 33 has a depth such that when the lower edge of the latching bar 27 is in engagement therewith the latching bar is completely removed from the notch 25 and just clears the extreme edge 23. As best shown in FIGURE 6, the arcuate surface formed on the extreme edge 23 terminates at the beginning of the extreme notches formed therein and safety ears or lugs 43 are provided. The lugs 43 are sufficiently long so that they will contact the latching bar 27 when it is in its completely depressed position against the bottom edge of the slot 33. Thus, the lugs 43 will function as stop means to prevent the pivoting of the steering wheel to the point where the extreme angularity would result in damage to components of the steering system.

It can be appreciated that the present invention provides an arrangement whereby the steering wheel can be angularly positioned as the operator desires for maximum ease and convenience. Regardless of the degree or frequency of tilting, none of the components of the hydrostatic steering system will be affected thereby. That is, the control pump and the hydraulic lines connected thereto will remain immobile as the steering wheel is tilted. Since the hydraulic components of the hydrostatic steering system are completely isolated from the moving elements required for the tilting operation, the possibility of failure of any of the hydraulic components is considerably reduced, thereby increasing the safety thereof and minimizing the maintenance required.

While two embodiments of the present invention are shown and described, it is to be understood that various other changes and modifications could be made without departing from the scope of the invention as defined by the appended claims.

What is claimed is:
1. In a hydrostatic steering arrangement for a wheeled vehicle having a frame and a hydraulic steering circuit including a control pump, the improvement comprising:
   mounting means for securing said pump on said frame,
   a pair of brackets transversely spaced on either side of said pump and secured to said frame,
   an adjustable support pivotally carried on said brackets,
   a steering wheel rotatably retained in said support,
   a yoke attached to said steering wheel for rotation therewith,
   a crossbar affixed to said pump,
   a compensating ring pivotally secured to said crossbar and said yoke to define substantially perpendicular intersecting pivot axes,
   said pivot axes defining a plane,
   the pivotal attachment of said support and said bracket defining a pivot axis,
   said pivot axis always being in said plane,
   and lock means connected between said support and said brackets for selecting positioning the steering wheel with respect to said frame.
2. A hydrostatic steering arrangement according to claim 1 wherein said lock means comprises:
   a pin means carried by one of said brackets for movement toward and away from said support,
   bias means urging said pin means toward said support, and
   said support having a plurality of recesses arranged in an arc having its center at the pivotal attachment of said bracket and support and being engageable by said pin means to lock said support relative to said frame.
3. A hydrostatic steering arrangement according to claim 1, wherein said lock means comprises,
   a slot formed in one of said brackets,
   bar means pivotally secured to the other of said brackets and extending around said pump and through said slot,
   an extended arm on said support having a plurality of notches along the extreme edge thereof,
   bias means urging said bar means toward and into engagement with one of said notches, and
   safety lugs on said extended arm and having a length such that when said bar means is depressed against the bottom of said slot, said lugs will contact said bar means thereby preventing excessive tilting of the steering wheel.
4. In a completely hydrostatic steering arrangement for a wheeled vehicle having a frame and a hydraulic steering circuit including a control pump, the improvement comprising; mounting means for rigidly securing said pump on said frame to preclude relative movement therebetween and between said pump and the remainder of said circuit, an adjustable support pivotally mounted on said frame, a steering wheel rotatably carried by said support, flexible drive means connecting said steering wheel to said pump, said pump being positioned in close proximity to said steering wheel and separated therefrom substantially only by said flexible drive means, and lock means connected between said support and said frame for selectively positioning said support with respect to said frame, whereby the hydraulic steering circuit is completely isolated from movement as the adjustable support is pivoted to provide the desired angular orientation for the steering wheel.
5. A hydrostatic steering arrangement according to claim 4, wherein said flexible drive means comprises:
   a yoke secured to one of said pump and said steering wheel,
   a crossbar secured to the other of said pump and steering wheel, and
   a compensating ring pivotally attached to both said yoke and said crossbar to define transverse pivot axes, said pivot axes defining a plane which includes the pivot axis resulting from the pivotal attachment of said support on said frame.

6. A hydrostatic steering arrangement according to claim 5, wherein said lock means comprises:
a pin means carried by said frame for movement toward and away from said support,
bias means urging said pin means toward said support, and
said support having a plurality of recesses arranged in an arc having its center at the pivotal attachment of said support and said frame and being engageable by said pin means to lock said support relative to said frame.

7. A hydrostatic steering arrangement according to claim 5, wherein said lock means comprises:
a slot formed in one of said brackets;
bar means pivotally secured to the other of said brackets and extending around said pump and through said slot,
an extended arm on said support having a plurality of notches along the extreme edge thereof,
bias means urging said bar means toward and into engagement with one of said notches;
and safety lugs on said extended arm and having a length such that when said bar means is depressed against the bottom of said slot said lugs will contact said bar means thereby preventing excessive tilting of the steering wheel.

References Cited
UNITED STATES PATENTS

| | | | |
|---|---|---|---|
| 2,008,344 | 7/1935 | Wilhelm | 280—87 |
| 2,770,981 | 11/1956 | Fieber | 74—493 |
| 2,830,464 | 4/1958 | Winterbauer | 74—555 |
| 2,920,709 | 1/1960 | Holmes et al. | 64—18 |
| 3,167,971 | 1/1965 | Zeigler et al. | 74—555 X |
| 3,199,625 | 8/1965 | Liebreich | 74—493 X |
| 1,953,742 | 4/1934 | Bunch et al. | 280—87 |
| 2,229,394 | 1/1941 | Stinne | 280—87 |

KENNETH H. BETTS, *Primary Examiner.*